United States Patent [19]

Schumacher

[11] Patent Number: 4,617,177
[45] Date of Patent: * Oct. 14, 1986

[54] SYSTEM FOR CONTINUOUS SOLID/LIQUID EXTRACTION

[76] Inventor: Heinz O. Schumacher, Höperfeld 26, Hamburg 80, Fed. Rep. of Germany, D-2050

[*] Notice: The portion of the term of this patent subsequent to Jun. 28, 2000 has been disclaimed.

[21] Appl. No.: 432,776

[22] Filed: Oct. 4, 1982

[30] Foreign Application Priority Data

Oct. 12, 1981 [EP] European Pat. Off. ........ 81108211.4

[51] Int. Cl.$^4$ ..................... B01D 11/02; B65G 33/14; C11B 1/10
[52] U.S. Cl. .................................. 422/273; 198/662; 198/671; 260/412.4; 422/274; 422/281; 426/430
[58] Field of Search .............. 260/412.2, 412.4; 422/49, 273, 275, 276, 274, 281; 99/298 R, 501, 503, 523, 510; 426/430; 198/625, 661, 662, 671; 423/137

[56] References Cited

U.S. PATENT DOCUMENTS

| | | | |
|---|---|---|---|
| 1,685,534 | 9/1928 | Drahn | 422/273 X |
| 1,862,945 | 6/1932 | Schlotterhose | 422/273 X |
| 2,158,427 | 5/1939 | Reichart | 422/273 X |
| 2,321,923 | 6/1943 | Levine et al. | 422/273 |
| 2,355,091 | 8/1944 | McDonald | 422/273 X |
| 2,447,845 | 8/1948 | Dinley | 422/274 X |
| 2,547,577 | 4/1951 | Hamacher et al. | 422/274 X |
| 2,567,219 | 9/1951 | Lesniak | 198/625 X |
| 3,056,487 | 10/1962 | Kipper | 198/661 |
| 3,471,328 | 10/1969 | Bruniche-Olsen | 422/273 X |
| 3,508,683 | 4/1970 | Van Der Schee | 198/661 X |
| 4,313,912 | 2/1982 | Barger | 422/275 X |
| 4,390,506 | 6/1983 | Schumacher | 422/281 X |

Primary Examiner—Barry S. Richman
Assistant Examiner—B. P. Heaney
Attorney, Agent, or Firm—Bachman & LaPointe

[57] ABSTRACT

A system for the solid/liquid extraction of in particular vegetable raw materials, such as oilseeds and oil-yielding plants, with low-boiling solvents, such as gasoline and the like, in continuous co-current manner.

The equipment, which is also to be regarded as the actual extraction unit, is formed by the combination of a conveyor screw (1) having a screw flight pitch (3) which widens in the direction of the transport of material, and a screen-like or perforated bottom portion (4) provided at a short distance upstream of the discharge of the extracted material (6). The equipment is closed on all sides.

Several individual sets of equipment of this type are combined in the installation and interconnected by a logical circulation system for the miscella in such a way that the extraction time is shortened, the extraction yield is improved and the residual solvent content in the fully extracted material (groats) is reduced. The installation is built up in accordance with the modular principle by arranging, in particular, four extraction units (sets of equipment) in series.

13 Claims, 4 Drawing Figures

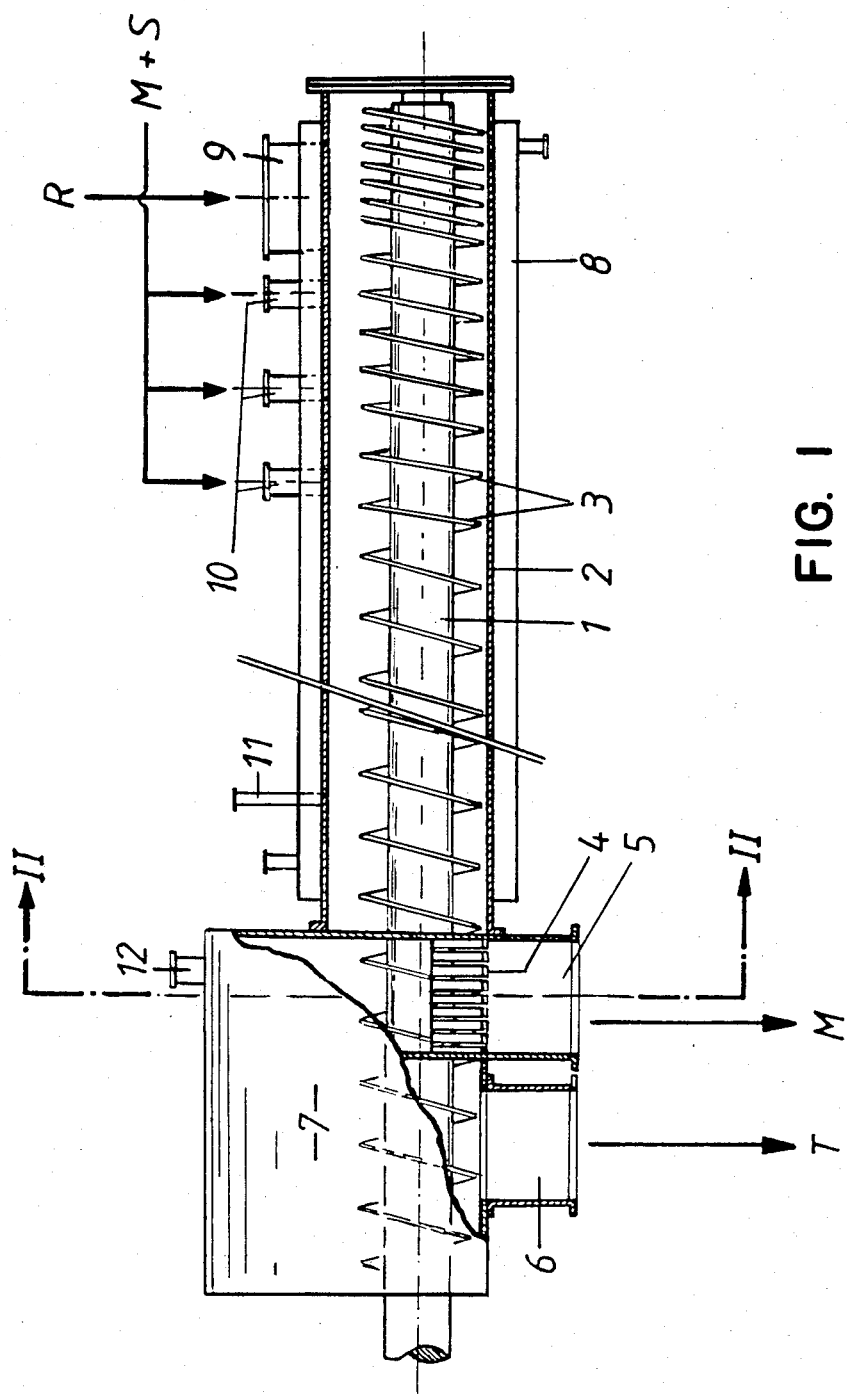

SYSTEM FOR CONTINUOUS SOLID/LIQUID EXTRACTION

BACKGROUND OF THE INVENTION

The invention relates to equipment and to a process for solid/liquid extraction, as used, for example, with vegetable raw materials for the production of fats and oils, flavoring substances, active ingredients of drugs, natural products, sugar solutions and the like. In particular, the invention can be employed advantageously, without thereby restricting its range of applications—in the solvent extraction of oilseeds and oil-yielding plants, the glyceride constituents (oils and fats) extracted from the predominantly solid raw material passing into the liquid phase, the so-called miscella.

The extracting agents used for oilseeds and oil-yielding plants in industrial operation are almost exclusively gasoline, hexane, heptane, octane or mixtures thereof having boiling ranges of 60°–100° C. These relatively low-boiling extracting agents pose stringent requirements on the constructional expense on both the equipment and the processes. The expense relates to the safety of the maintenance and operating personnel coming into contact with the solvents and to optimum operational control, so that the extraction remains within economically acceptable limits.

Equipment and processes for continuously operating extraction processes in one or more stages are widely known and are discussed in detail in the relevant specialist literature. Examples of suitable equipment are vertically arranged extraction towers with or without stirrer elements, horizontally aligned belt frame extractors, pot extractors, screw extractors, bucket extractors or basket extractors. Equipment of this type is described, for example, in French Pat. No. 1,020,991, British Pat. No. 1,161,945, U.S. Pat. No. 2,587,556 or in German Pat. Nos. 1,617,004 and 1,149,232.

In particular in the case of the extraction of vegetable raw materials, such as oilseed and oil-yielding plants, to which particular reference is made below by way of example, most types of the known equipment work in counter-current manner, that is to say the fresh extracting agent is used for a final wash of the material already largely extracted. This end phase of the extraction can be preceded by further extraction stages, so that finally a miscella (liquid phase) is obtained which, depending on the type of extractor, contains about 15–35% of oil and 85–65% of solvent.

In general, the same quantity by weight of fresh solvent as that of the solid material employed is added to the raw material.

This quantitative ratio of solvent to solid raw material of about 1:1 applies, for example, whenever, say, in the direct extraction of soya beans or in the extraction of pressed cakes of other oilseeds and oil-yielding plants, the so-called percolation process is operated in belt frame extractors, bucket extractors or basket extractors. In this connection, reference may be made to French Pat. No. 1,020,991, British Pat. No. 1,161,945, U.S. Pat. No. 2,587,556 or German Pat. No. 1,617,004.

In the case of several extraction stages, it is necessary that the miscella obtained is circulated in each individual stage, since the solvent introduced into the extractor at the start is not by itself sufficient to insure optimum wetting of the material to be extracted.

The reason for this is that the percolation capacity of the raw materials to be extracted is in many cases considerably greater than would correspond to the action of the relatively small quantity of fresh solvent at the start of the extraction. In fact, at the feed point of the fresh solvent, uniform and complete wetting takes place only to a limited extent; rather, channels soon form, through which the solvent percolates without being utilized As already mentioned above, there are predominantly economic reasons for the fact that the quantity of solvent is limited to a ratio of about 1:1 relative to the raw material, although substantially more solvent would be required for good wetting. With a higher proportion of solvent, the costs and the equipment required for the subsequent distillation of the miscella, that is to say for the separation of solvent and extracted material, for example, oil, would rise considerably, and the profitability of the overall process would be put in question.

In order to insure, nevertheless, uniform and adequate wetting of the raw material, which is to be extracted, in the extraction phase or in the successive further stages of a multi-stage extraction unit, considerable quantities of miscella, of an order of magnitude of about three to five times the fresh solvent quantity charged, are continuously circulated. The aim here is flooding of the introduced material by circulated miscella, and this is in fact realized in many cases.

It is this flooding alone which insures that uniform wetting and hence percolation can be expected within one extraction zone or chamber.

The measures discussed here are described, for example, by W. Kehse in Chemiker-Zeitung/Chemische Apparatur/Verfahrenstechnik, 94 (1970), Pages 56–62. By circulating the miscella only within the region of individual extraction chambers, the latter are always kept at a defined liquid level, while the miscella is passed on from chamber to chamber only by overflow. As illustrated by FIGS. 1 and 8 (loc. cit.), the solvent enters the last chamber and flows from stage to stage in counter-current relationship to the material to be extracted. An optimum extract content (oil content) in the miscella is obtained only in the last stage or chamber. The use of pumps which, in a manner of speaking, are marking time and which in many cases take substantially more power than would be sufficient for the quantity of miscella to be delivered, is associated with a considerable cost for energy and equipment.

It is therefore a first object of the invention to avoid the expense on the involved, time-intensive and energy-intensive as well as oversized equipment for the circulation pumps, which serve solely to wet the extraction material, within one extraction unit.

As is known, the diffusion on which the extraction is based follows a thermodynamic equilibrium process which proceeds without producing work, and isothermally.

The diffusion can be described by Fick's 1st and 2nd laws which, for the case that the concentration (c) depends only on a position coordinate (x), states the following:

$$m = D(dc/dx) \qquad \text{(Fick's 1st law)}$$

with
　$m$ = density of material flow (kg/m²/h)
　$c$ = concentration
　$D$ = diffusion coefficient, whereas if D is independent of concentration, the time (t) must be included:

$$c/t = D(d^2c/dx^2) \quad \text{(Fick's 2nd law)}.$$

Accordingly, the rate of diffusion is thus proportional to the concentration gradient of an extraction time unit, that is to say the less the extracting agent (solvent) is enriched in extract (miscella) the higher is the diffusion coefficient and hence the rate of extraction. In other words, the degree of extraction $$\frac{\text{Extract in the extraction material} - \text{extract in the extraction residue}}{\text{Extract in the extraction material}} \times 100$$

approaches a limit value, the time interval of which is determined by the diffusion power of the solvent, the diffusion power being inversely proportional to the concentration of extract (for example oil) in the solvent.

The requirements of Fick's laws of course presuppose complete wetting of the extraction material in industrial operation, but this cannot be attained by pure solvent alone, because of the unfavorable solvent/extraction material ratio (actual solvent/extraction material ratio about 1:1).

It is therefore indispensable to increase the liquid fraction in the solvent/extraction material mixture by adding already enriched miscella (enriched solvent) to the fresh solvent and additionally, (+) as described above, (+) to insure adequate wetting by circulation within one extraction unit.

However, such measures interfere, (+) as derived above, (+) with fulfilling Fick's law and are therefore not very suitable for obtaining an optimum operational efficiency of the extraction within an acceptable time interval.

It is therefore a further object of the invention to achieve uniform and complete wetting of the extraction material, especially in a multi-stage extraction, with the miscella of only the preceding stage and without mixing with miscella of a subsequent stage, and without circulation of the miscella within one individual stage.

This leads to a considerable shortening of the extraction period. Most of the extractors which have hitherto been disclosed and which are very expensive in equipment technology, have the disadvantage that they can be operated economically only with large volumes, that they require high investment in maintenance, that they hardly give scope for varying the capacity and that the extracted material, that is to say the groats in the special case of vegetable raw materials, still contains considerable proportions of solvent, predominantly 30% and more.

These disadvantages affect not only the large-space carousel extractors, basket belt extractors, belt frame extractors and bucket extractors, but also the basket extractors or drum extractors, which operate at lower capacities. Although the latter also permit the throughput of small quantities of extraction material and solvent, they cause, instead, considerable technical problems in discontinuous operation, because of the involved opening, emptying, filling, closing and the like, all of which must be carried out batchwise.

As already said, a factor which adversely influences the mass balance and energy balance of large-volume extractors is in particular the disadvantageous ratio of solvent in the miscella to solvent in the extracted groats.

Many cases have become known, in which the "fully extracted groats" contain as much as 40% of solvent, which is not only missing for the dilution of the miscella (wetting of the extraction material) but must also be recovered from the groats in a downstream process with a considerable energy consumption.

A reduction of the solvent content in the groats therefore has a considerable influence on the capacity of the downstream units (desolventizer, toaster and the like). Moreover, it improves the heat balance of the entire unit, since the saving of steam in the gasoline removal (expelling the solvent from the groats) runs parallel to the reduction of solvent in the groats.

A further object of the invention is therefore the avoidance of the disadvantages, characteristic of large-volume extractors, with respect to the solvent content in the groats and the recovery of the solvent.

SUMMARY OF THE INVENTION

The subject of the invention is equipment for the continuous extraction of, in particular, vegetable raw materials with organic solvents. The novel equipment (extractor) operates in accordance with the principle of a transport screw with co-current relationship of extraction material and extracting agent (solvent). However, the novel extractor differs from a simple screw system by important constructional elements. It is constructed in such a way that the screw flights, starting at the feed point of the extraction material, widen in the direction of the discharge. This widening of the screw flights (flight pitch) can here be continuous, that is to say uniformly from screw flight to screw flight, but it can also be group-wise if, for example, a certain percentage of the total length of the screw is formed in each case by a certain number of equal flight pitches. In all cases, the flight pitch reaches its greatest value at the discharge of the material.

The screw moves in a closed trough or a closed tub which, shortly upstream of the discharge of material, have a bottom portion in the form of a screen or with perforations. In the case of circular troughs or tubs, this screen-like or perforated bottom portion can amount to 60–75% of the circumference of the trough.

Even though this is not obligatory, it has proved to be advantageous when additional stirrer elements are distributed over the length of the screw to insure additional thorough mixing of the contents of the extractor.

The screw itself is at a distance of a few millimeters up to the order of magnitude of one centimeter from the screw bottom; by contrast, the distance from the upper portion of the trough or tub can be many times greater.

Several pipe connections for introducing solvent and/or miscella lead into the trough or tub, predominantly in a vertical alignment and, in some cases, also in an oblique alignment. These pipe connections can be distributed over the entire length of the screw, but they are arranged more closely behind one another in the first third of the screw, that is to say in the region where the extraction material is fed in.

Moreover, the invention relates to an installation having several, but at least two, extraction units which are arranged one after the other or one below the other and hence interact directly. The arrangement of several units below one another has the advantage that the extraction material is conveyed from unit to unit solely by gravity, and the outflow of miscella also takes place without conveying elements.

In an installation with several extraction units according to the invention, the outlet of extraction material from a preceding unit leads into the feed of extraction material to the subsequent unit and so on, so that a continuous flow of the extraction material through the entire installation results. The miscella which is obtained in the individual extraction units and which in fact, (+) due to the special construction of the next extractor, or its screen-like or perforated bottom portion, (+) has already been separated from the extraction material in the extractor, is collected, without being mixed with miscellae of other extraction units, in a container having several compartments or in separate receivers and is circulated in each case into the preceding extraction unit.

Product miscella, that is to say extract for further processing (oil/solvent separation) is in principle withdrawn from the first extraction unit of a multi-unit installation, that is to say from that unit to which fresh extraction material is charged. Fresh solvent, however, is charged to the last extraction unit, from which also the extracted material is withdrawn.

The most important requirement for smooth interaction of several individual extractors within the combined system of a multi-unit installation is that fresh solvent is in principle fed into the last unit and is thus contacted with already depleted extraction material. The concentration of the weakly enriched miscella (extract) from the last extraction unit is further increased in the penultimate unit by contact with less extensively depleted extraction material, and so on.

In all these steps, the extraction takes place in co-current manner, that is to say fresh solvent (in the last unit) or stepwise enriched solvent (miscella) are passed in the same direction as the extraction material, that is to say in co-current manner through the entire installation, independently of the number of extraction units within the installation.

It is to be understood that, within such a multi-unit installation, the individual extraction units can have different capacities or different volumes with different speed of rotation (conveying speed) of the screw, or different flight pitches of the screw, and the like. For example, this can be important especially for the first and last unit of an installation.

In installations having several extraction units, four such units have proved to be particularly suitable in operational practice.

The invention also relates to a process for the continuous extraction of, in particular, oil-containing vegetable raw materials with organic solvents. In this process, the extraction material and the solvent or miscella are passed in co-current manner with one another through a conveyor screw arranged in a container or trough. In this case, the screw has screw flight pitches which widen in the direction of the transport of material and hence determine the contact time between the extraction material and the solvent or miscella. Complete wetting of the extraction material with solvent and/or miscella therefore already takes place in a very short time, even in the case of extraction material/solvent and/or miscella ratios of 1:1 or >1:1. The new process requires a separation of miscella and extraction material already in the screw unit, and this is made possible by a screen-like or perforated end portion of the bottom of the screw container or trough.

The process can also be operated in a combined system of several extraction units. In this case, fresh solvent is charged to a last extraction unit, the miscella taken from the last extraction unit is recycled to the penultimate unit, and so on, and the miscella of the first extraction unit is withdrawn for further processing or separation (oil/solvent). This process has proved particularly suitable for four extraction units in a combined system.

As already stated in the introduction, a salient point of the new process is the fact that the extract, for example oil, can pass in each extraction unit from the extraction material into a solvent phase and/or miscella phase of lower concentration. If, for example, the extraction material contains 20% of oil and if the extraction material/fresh solvent batch ratio is about 1:1, the concentration of the miscella, in an installation having several extraction units, increases by a factor of 2.5 to 3 in each case from unit to unit. Since, according to the invention, the miscella of a preceding extraction stage is not mixed with the miscella of the subsequent extraction unit, before there is contact with the extraction material, the concentration gradient of the charged miscella relative to the concentration of the extract fractions still present in the extraction material is particularly steep, and this leads to a considerable shortening of the extraction period. In particular in the case of extraction units and installations for, for example, soya material with an oil content of about 20%, which require extraction periods of 40 to 60 minutes for throughputs of extraction material of up to 3,500 tons/24 hours, use of the equipment and installation of the invention can shorten the extraction period by about 50%.

The design of the extraction units according to the invention also has considerable advantages in, in particular, equipment technology. Large extractors of previous design, as mentioned at the outset, can no longer be constructed as transportable units if the output is greater than 400 to 600 tons/24 hours; rather, they can be transported only as part elements to the place of operation and must be assembled there to form the complete unit. By contrast, the relatively compact extractors with few awkward shapes according to the present invention are fabricated completely in the equipment factory and can be used directly as such at the place of operation, it being possible in a very simple manner to couple several units to form a multi-unit installation.

It has proved to be particularly advantageous to design the screw of the extraction unit as a twin-screw with intermeshing screw flights. This leads to particularly good and rapid contacting between the extraction material and the solvent and/or miscella.

The length and capacity of the extremely compact extractor according to the invention can be varied as desired. The extractor can therefore be fabricated in any desired standard sizes in the factory. Moreover, it can be adapted to the particular conditions of the extraction material (origin, oil content, structure of plant, and the like).

The optimum contact between the extraction material and the solvent and/or miscella, which contact is achieved by the very specific construction of the equipment (extractor) and which leads to an early homogenization of the materials introduced in the narrower flight pitch range of the screw and from there passes the material forward to a gradually calmer zone with widened flight pitches of the screw, has the result of a measurably improved extraction effect which manifests itself not only in the shortened period mentioned above, but also yields a fully extracted material, the solvent content of which is considerably reduced.

The miscella flows away continuously from the discharge of the extraction material, and this makes it possible to dispense with additional filter units before the removal of gasoline from the extraction material residue (groats). The groats are almost dry and the expense on gasoline removal (expense on equipment, personnel and energy) is substantially reduced. Moreover, it has been found that the new extractor is also capable of extracting those materials which are difficult to percolate, since the extraction takes place preferentially in the region of the screw with small flight pitch, where the extraction material is in true suspension in the solvent. In the region of the perforated trough bottom of the extraction unit, the supernatant solvent or miscella over the extraction material can flow off laterally to a considerable extent through the screen openings or perforations.

Finally, it should be noted that the engineering design of the equipment (extractor) also provides improved safety for the operating personnel. Apart from the screw, there are no moving, mechanically interacting components, such as rollers, bearings, chains and the like in the extractor or in its gas space. The mutual interaction of metallic parts, which was hitherto observed in known large-volume extractors and could not be prevented and which can lead to the formation of sparks and hence to explosions and fires, does not occur in the equipment according to the present invention.

It should also be noted that there is no lubrication of moving mechanical parts within the extraction space. Contamination of the extract with lubricants is therefore impossible.

BRIEF DESCRIPTION OF THE DRAWINGS

The invention is described in more detail below by reference to FIGS. 1-4 which diagrammatically reproduce the construction of the extraction equipment according to the invention.

In the drawings:

FIG. 1 shows a section of an embodiment of the extraction equipment;

DETAILED DESCRIPTION

Figure 3:
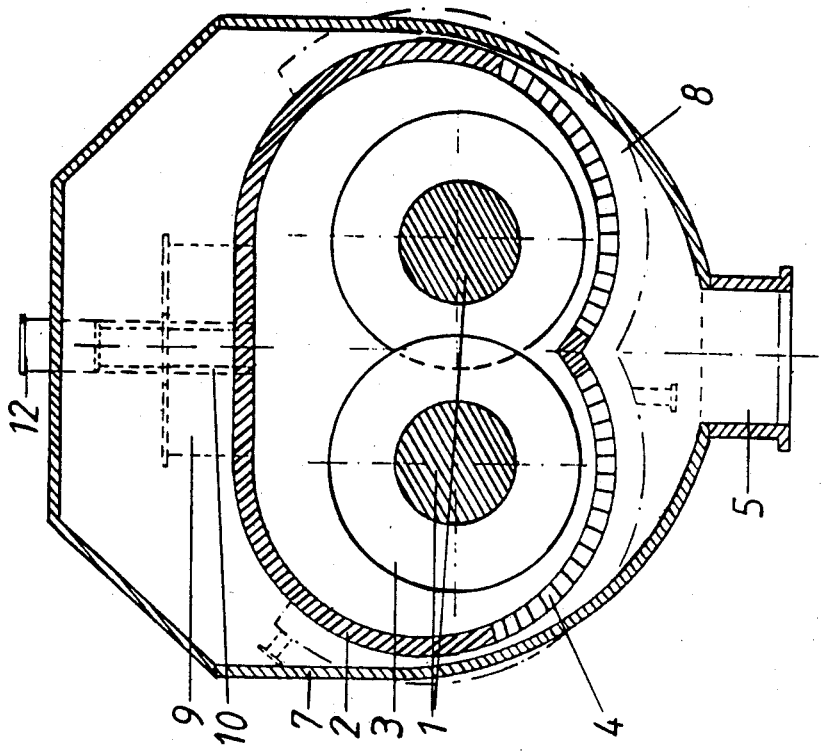
FIG. 3 shows the same extractor in a section II—II, but with two intermeshing screw units.

In FIG. 1, the novel extractor is shown diagrammatically in its most simple embodiment. It consists essentially of the screw 1 with the screw flights 3 which have their lowest flight pitch or spacing at the feed point of the raw material (branch 9). This flight pitch widens continuously or group-wise and reaches its greatest value at the opposite end at the place of the groats discharge 6.

The screw 1 is guided in a trough or tub 2, the bottom of which is only at a small distance, of say a few millimeters, from the crowns of the screw flights. By contrast, the distance of the upper portion of the trough 2 from the crowns of the screw flights 3 is many times greater.

A short distance upstream of the groats discharge 6, the bottom of the trough or tub has a screen-like or perforated portion 4, the openings of which are selected such that the miscella can run out, but the groats cannot pass through. The perforated portion 4 can be fitted interchangeably, so that different opening cross-sections (holes, slots and the like) can be provided, depending on the grain size of the groats.

In FIG. 1, this portion is shown, for example, as a bottom with slot-like openings.

The groats are pushed by the screw over the portion 4 and leave the installation with a very low solvent content via the discharge 6 which leads to the solvent recovery T.

The miscella M collects underneath the screen portion 4 and flows continuously to further processing (filtration, clarification, evaporation) or is circulated for renewed feeding into the extractor.

The extraction material R is introduced via the connection 9 at the start of the screw. It is to be understood that control equipment, metering equipment and measuring equipment, such as are usual in process engineering, are not mentioned here individually.

In the running direction of the screw, a multiplicity of connection branches 10 for solvent and/or miscella are provided on the upper portion of the trough 2. These branches can be arranged vertically and thus guide the liquid in each case vertically onto the raw material, but they can also be fitted laterally at opposite points in the upper third of the trough, so that better wetting of the raw material is obtained.

The branches 10 are connected via suitable control instruments to both fresh solvent and to tanks for recycled miscella. A suitable pipe connection system, not shown here, allows miscella or fresh solvent to be fed at any point of the extraction region.

The trough or tub 2 can be fitted with a steam jacket 8 or another suitable heat source for indirect heating.

The installation is completed by vent connections 11, which can, if necessary, lead to a dephlegmator for vaporized solvent, lines for feeding inert gas, not shown, and additional pipe connections 12 for feeding solvent for the final wash of the groats on the screen bottom 4.

It is advantageous when the screw ends in a removable widened portion (box) 7, which encloses the two discharge openings for groats 6 and miscella 5.

Figure 2:
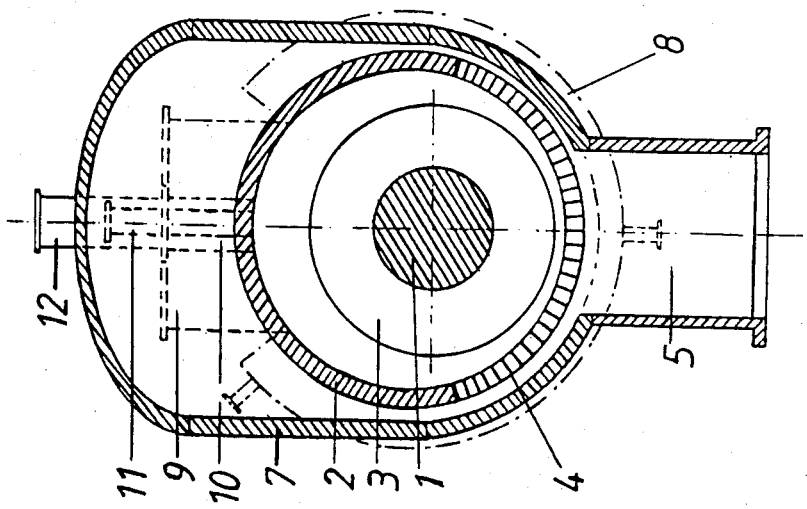
FIG. 2 shows the extractor according to FIG. 1, in a section II—II.

FIG. 2 shows a section along II—II of the extractor according to FIG. 1.

Finally, FIG. 3 also shows a particularly advantageous construction with two intermeshing screws 1,3 which are arranged in the common trough 2 with a perforated portion 4 at the end of the trough. Of course, these screws also have the change factor, significant for the invention, of the pitch of the screw flights.

Figure 4:
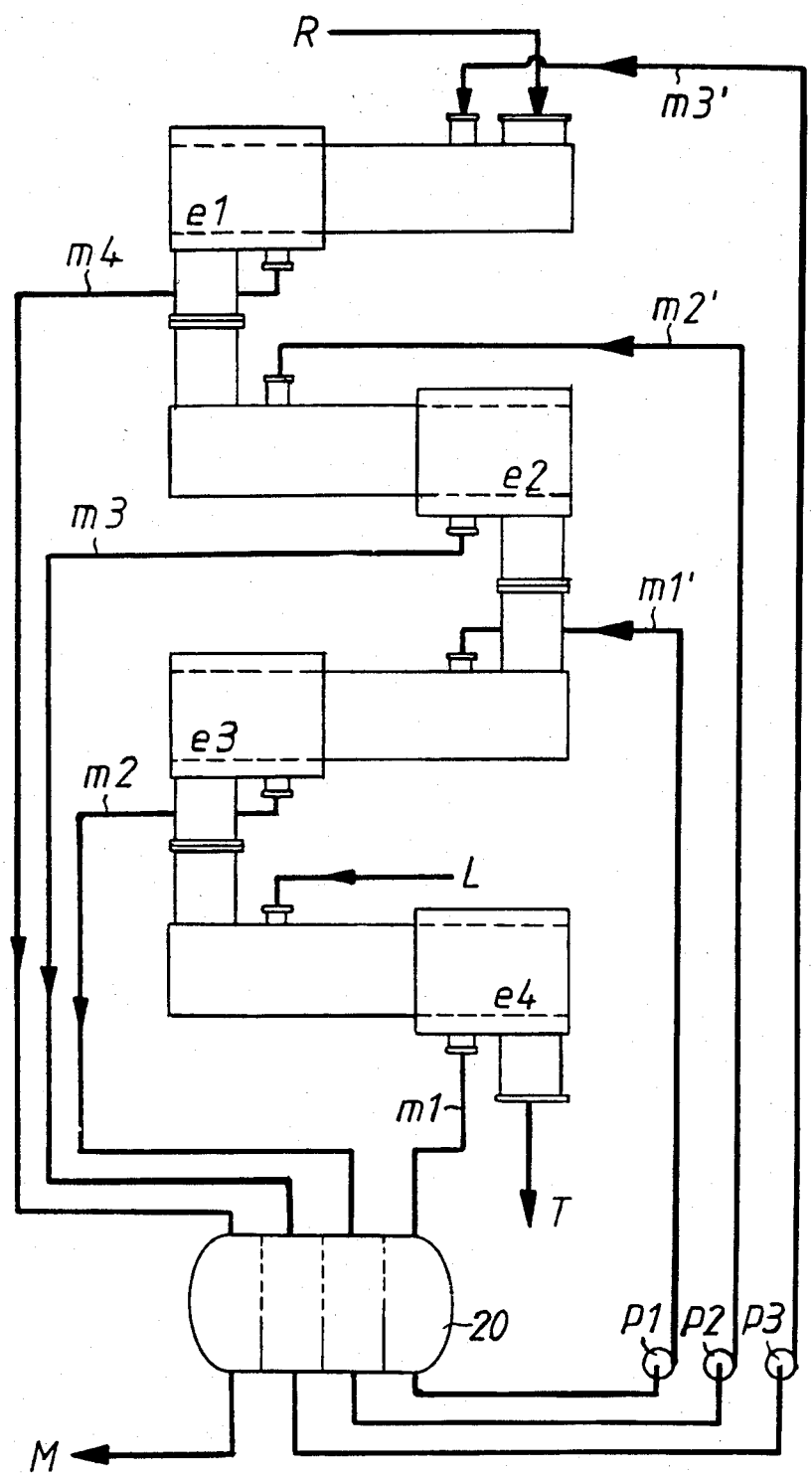
FIG. 4 shows a diagrammatic illustration of an extraction installation with four extraction units according to FIG. 1.

In the system in FIG. 4, as an example of an installation with four extraction units e1, e2, e3 and e4, the units are arranged one above the other in this special case. In principle, the extraction units e1, e2, e3 and e4 are identical with the equipment according to FIGS. 1-3.

The discharge of the extraction material from each extraction unit, with the exception of the fourth and last unit, is directly connected to the extraction material inlet of the subsequent extraction unit, that is to say the branch 6 of each unit is coupled to the branch 9 of a subsequent unit.

This results in a continuously, completely closed flow of material through all the extraction units up to the discharge T from the fourth and last unit. This flow of material takes place solely by gravity, assisted by the screws running in the extraction units.

According to FIG. 4, the dried and comminuted fresh extraction material, for example soya bean material (soya flakes) in introduced continuously via R into the first extraction unit e1, which in the present special case is at the top, and is wetted by and mixed with the miscella m3' from the subsequent, second extraction unit e2 located below. This miscella m3' flows out continuously through the screen bottom or the perforated portion 4 of e2, compare FIG. 1, and passes via line m3 into a compartment or part receiver of the collecting vessel 20. From there, it is introduced, without being mixed with or diluted by miscella from other extraction units, or fresh solvent, via the pump p3 into the extraction unit e1 where it is contacted with fresh extraction material R, completely wets the latter and initiates the oil depletion process from the fresh extraction material. The extraction process or depletion process takes place in co-current manner.

The miscella flowing out of the third extraction unit e3 passes via line m2 in the same way into a compartment or part receiver of the vessel 20. It is then taken up by the pump p2 and is charged via line m2' to the second extraction unit e2. In the latter, the same process as in e1 takes place, but with slightly depleted extraction material and enriched miscella as the reaction component. The extraction process again takes place in co-current in a completely closed system.

In the same way, the miscella from the fourth and, in this case, last extraction stage e4 passes via line m1 into a compartment or part receiver of the vessel 20, and is transported by pump p1 and line m1' into the third extraction unit e3.

The circulation of miscella is completed by a fourth compartment of the vessel 20, into which the concentrated miscella from e1 flows continuously via line m4, and this miscella is then fed to a downstream treatment system M for separating oil and solvent.

The oil-free or oil-depleted extraction material (groats) leaves the installation through the groats discharge 6, see FIG. 1, of the last, fourth extraction unit e4 and then passes to a treatment stage T (gasoline removal, toaster, and the like).

Fresh solvent enters the process in the last and fourth extraction unit e4 via all or one of the branches 10, see FIG. 1, and starts the circulation in the direction of e3, e2 and so on. By means of this procedure, illustrated by the example of a four-stage installation, the solvent is enriched stepwise, but continuously and without dilution by overflowing miscella from other stages. The enrichment of the solvent with extract (oil) takes place in the order e4–e1, while the depletion of oil from the extraction material proceeds in the converse order e1–e4.

It has already been stated that the residence times of the extraction material and of the miscella in the individual extraction units and hence within the overall installation can be varied as desired by the controllable speed of rotation of the screw, the flight pitch and the nature of the flight pitch (continuous or group-wise widening) and by closing elements (slides, valves and the like, not shown) on the branches 5, 6, 9 and 10.

However, this also has the consequence that the novel extractor also makes it possible to use solvents having low boiling ranges and low molecular weights, which solvents, as is known, diffuse more intensively through the cell membranes of the raw materials. This provides for the first time a feasible method for the extraction, which has been desirable for a long time, by means of very low-boiling solvents. It is to be understood that the novel equipment is described here only by reference to its most important constructional features. Auxiliary elements, such as temperature sensors, pressure controllers, pipe systems, drive mechanisms and the like, which are known to any average expert, need not be described, since they are a matter of course.

Moreover, the geometrical shapes of the trough 2, of the superstructure (widened portion) 7, of the screw flights 3 and the like as shown, are only illustrative possibilities and not fixed outlines which would limit the scope of the invention.

What is claimed is:

1. An extraction unit for the continuous extraction of raw material with solvent which comprises a substantially horizontally aligned conveyor screw having a first, upstream and a second, downstream end, a vessel containing said screw and having a bottom portion and an upper portion, solids inlet means in said vessel adjacent said first end of the screw to provide a feed point for extraction material, solids discharge means in said vessel adjacent said second end of the screw to provide a discharge point for extraction material, said screw having flights throughout said vessel of varying pitch or spacing wherein the flights have a smallest flight pitch adjacent the feed point and widen in the direction of the discharge point to have a greatest value at the discharge point and wherein a section of the bottom portion of the vessel upstream of the discharge point and adjacent thereto is of screen-like or perforated design to permit passage of liquid phase, liquid outlet means directly connected to said section, and wherein said vessel has at least one solvent inlet connection branch communicating with said screw downstream from the feed point and upstream from the discharge point.

2. A unit according to claim 1 wherein the screen-like or perforated section of the vessel is removable to permit said section to be interchangeable with sections of differing perforation sizes.

3. A unit according to claim 1 wherein said conveyor screw comprises an intermeshing twin screw.

4. A unit according to claim 1 wherein said flight pitch widens in a group-wise manner.

5. A unit according to claim 1 having a multiplicity of said solvent inlet connection branches aligned vertically.

6. A unit according to claim 1 wherein the part of said vessel which houses said discharge point and said perforated section is wider than the part which houses said feed point and said solvent inlet.

7. A unit according to claim 1 wherein the crowns of the screw flights are arranged close to the bottom portion of the vessel than the upper portion of the vessel.

8. A unit according to claim 1 in combination with at least one additional unit to form an extraction installation, said units being arranged in series with the solids discharge means of a first unit being in communication with the solids inlet means of a second unit and the liquid outlet means of said second unit being in communication with the solvent inlet connection branch of said first unit, thereby providing means for a continuous flow of material through said units.

9. An extraction installation according to claim 8 further comprising a third unit in series, the solids discharge means of said second unit being in communication with the solids inlet means of said third unit and the liquid outlet means of said third unit being in communication with the solvent inlet connection branch of said second unit.

10. An extraction installation according to claim 9 wherein four units are provided, the liquid outlet means from the first unit communicating with a treatment means, the respective liquid outlet means of the second, third and fourth units are connected via lines to second, third and fourth receiving means, respectively, said second, third and fourth receiving means are connected via separate pumps and separate recycle lines, respectively, to the solvent inlet connection branches of the first, second and third units, and the connection branch of fourth unit being connected to a fresh solvent feed means.

11. An extraction installation according to claim 9 wherein said liquid outlet means of said second and third units communicate with the solvent inlet connection branches of the first and second units, respectively, via a receiver, said liquid outlet means of said second and third units communicating with said receiver via separate lines, said receiver comprising separate holding means for maintaining material discharged from said liquid outlet means separately therein, separate pumps being connected to said separate holding means, and separate recycle lines being connected to said separate pumps and to the respective solvent inlet connection branches.

12. An extraction installation according to claim 11 wherein the liquid outlet means from the first unit communicates with a treatment means.

13. An extraction unit for the continuous extraction of raw material with solvent which comprises a conveyor screw having a first, upstream end and a second, downstream end, a vessel containing said screw and having a bottom portion and an upper portion, solids inlet means in said vessel adjacent said first end of the screw to provide a feed point for extraction material, solids discharge means in said vessel adjacent said second end of the screw to provide a discharge point for extraction material, said conveyor screw being aligned in a substantially horizontal manner but rising in the direction of said second end, said screw having flights throughout said vessel of varying pitch or spacing wherein the flights have a smallest flight pitch adjacent the feed point and widen in the direction of the discharge point to have a greatest value at the discharge point and wherein a section of the bottom portion of the vessel upstream of the discharge point and adjacent thereto is of screen-like or perforated design to permit passage of liquid phase, liquid outlet means directly connected to said section, and wherein said vessel has at least one solvent inlet connection branch communicating with said screw downstream from the feed point and upstream from the discharge point.

* * * * *

UNITED STATES PATENT AND TRADEMARK OFFICE
CERTIFICATE OF CORRECTION

PATENT NO. : 4,617,177
DATED : October 14, 1986
INVENTOR(S) : HEINZ O. SCHUMACHER ET AL.

It is certified that error appears in the above-identified patent and that said Letters Patent is hereby corrected as shown below:

In Column 10, claim 1, line 19, after "upstream" insert ---end---.

In Column 10, claim 7, line 54, change "close" to read ---closer---.

Signed and Sealed this

Thirtieth Day of December, 1986

Attest:

DONALD J. QUIGG

Attesting Officer  Commissioner of Patents and Trademarks